United States Patent
Allen et al.

(10) Patent No.: US 7,392,410 B2
(45) Date of Patent: Jun. 24, 2008

(54) POWER ADAPTER HAVING POWER SUPPLY IDENTIFIER INFORMATION FUNCTIONALITY

(75) Inventors: Robert Allen, Lago Vista, TX (US); William O. Bain, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 377 days.

(21) Appl. No.: 10/966,779

(22) Filed: Oct. 15, 2004

(65) Prior Publication Data

US 2006/0085658 A1    Apr. 20, 2006

(51) Int. Cl.
G06F 1/26 (2006.01)
G06F 1/00 (2006.01)
G06F 11/30 (2006.01)

(52) U.S. Cl. ........................ 713/310; 713/340
(58) Field of Classification Search ........... 713/300, 713/310
See application file for complete search history.

(56) References Cited

U.S. PATENT DOCUMENTS

| | | | |
|---|---|---|---|
| 6,765,543 B1* | 7/2004 | Masuda et al. | 345/1.1 |
| 6,839,853 B2* | 1/2005 | Odaohhara et al. | 713/300 |
| 7,039,821 B1* | 5/2006 | Potega | 713/340 |
| 7,117,377 B2* | 10/2006 | Hagiwara et al. | 713/300 |
| 2003/0135769 A1* | 7/2003 | Loughran | 713/310 |
| 2004/0005818 A1* | 1/2004 | Judge et al. | 439/638 |
| 2004/0164721 A1 | 8/2004 | Kwatra et al. | |

* cited by examiner

Primary Examiner—Rehana Perveen
Assistant Examiner—Mohammed H Rehman
(74) Attorney, Agent, or Firm—Haynes and Boone, LLP

(57) ABSTRACT

In a method and system for an improved power adapter providing power to a load, the power adapter is electrically coupled to the load via a multi-conductor connector. A change in a current flowing through a conductor of the connector is sensed in response to the coupling. The power output of the adapter is enabled after establishing initial contact, as sensed by the change in the current. Power supply identifier (PSID) information is enabled for communication through the conductor after enabling the power.

20 Claims, 5 Drawing Sheets

POWER ADAPTER HAVING POWER SUPPLY IDENTIFIER INFORMATION FUNCTIONALITY

BACKGROUND

The present disclosure relates generally to information handling systems, and more particularly to power adapters providing power to portable information handling system components such as notebook computers, personal digital assistants (PDA's), cellular phones and gaming/entertainment devices.

As the value and use of information continues to increase, individuals and businesses seek additional ways to acquire, process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many of these IHS's, especially the portable ones, use external power adapters, which convert alternating current (AC) mains voltage to a direct current (DC) voltage that is useable by the IHS. These AC/DC power adapters generally reduce the size, weight, cost and heat generation characteristics of the portable IHS and make them more adaptable for use in different countries of the world having different AC input voltages.

The AC/DC power adapters are typically connected to the portable IHS via a multi-pin, co-axial, plug-in-type connector. One such well-known and widely used connector is a co-axial, plug-in-type 3-pin connector. The center pin is typically used as a data channel, while the two outer pins are used to provide power. Problems arising due to incorrect and/or improper insertion of the power connectors are well known. Even with a proper connection, the IHS or components thereof may be vulnerable to damage caused by significant inrush current due to the use of large capacitance filters in the power adapters and/or by the presence of higher-than-rated voltages on the data channel. For example, if the power adapter is connected to an AC power source (e.g., plugged into an AC wall outlet) before being connected to a DC power input receptacle of the IHS, then a significant inrush current may occur at initial contact, thereby potentially damaging the IHS. In addition, accidental coupling between an outer pin carrying a higher-than-rated voltage and the center pin (e.g., carrying the low voltage data channel) may damage the data channel processing components and/or circuits.

Therefore, a need exists to provide an improved method and system for providing power to portable IHS devices. More specifically, a need exists to provide an improved power adapter, which provides protection against damage caused by high inrush currents and accidental application of higher-than-rated voltages. Additionally, a need exists for the improved power adapter to maintain compatibility by utilizing widely accepted legacy connectors such as the 3-pin connector. Accordingly, it would be desirable to provide an improved power adapter operable to provide power to an information handling system, via widely used legacy connectors, absent the disadvantages found in the prior methods discussed above.

SUMMARY

The foregoing need is addressed by the teachings of the present disclosure, which relates to a system and method for managing power provided to an IHS. According to one embodiment, in a method and system for an improved power adapter providing power to a load, the power adapter is electrically coupled to the load via a multi-conductor connector. A change in a current flowing through a conductor of the connector is sensed in response to the coupling. The power output of the adapter is enabled after establishing initial contact, as sensed by the change in the current. Power supply identifier (PSID) information is enabled for communication through the conductor after enabling the power.

In one embodiment, a method for operating a power adapter providing power to a load includes electrically coupling the adapter to the portable IHS device by the connector. A change in the current flowing through a conductor of the connector is sensed in response to the coupling. The power output of the adapter is enabled after verification of the initial contact by the change in the current. The adapter is then enabled to provide PSID information through the conductor after powering the IHS device.

Several advantages are achieved by the method and system according to the illustrative embodiments presented herein. The embodiments advantageously provide for an improved power adapter having soft start and PSID information functionality supported through a single conductor. Thus, improved protection against damage caused by inrush current and accidental coupling between data pins and high voltage pins is advantageously provided while maintaining compatibility with legacy 3-pin connectors.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Examples of devices referred to in the present disclosure include AC/DC adapters, chargers, internal and/or external batteries, controllers, disk drives, scanners, printers, card readers, keyboards, and communication interfaces. Some devices may require a software program called a device driver program that acts as a translator between an application program and the device, or between a user and the device.

Connection of traditional power adapters to an AC power source, before being connected to a portable device, may result in a heavy inrush current upon initial contact. For multi-pin connectors, accidental connection between pins during the insertion process may result in the application of higher-than-rated voltage on a low voltage data channel. An improved power adapter providing power to a load via a legacy 3-pin connector may address both of these problems. In the improved system, a center pin of the 3-pin connector (functioning as the data channel) is used to sense current upon initial contact. Presence of the current is used to enable power output of the adapter. The same center pin is used to communicate PSID information after enabling the power output.

According to one embodiment, in a method and system for an improved power adapter providing power to a load, the power adapter is electrically coupled to the load via a multi-conductor connector. A change in a current flowing through a conductor of the connector is sensed in response to the coupling. The power output of the adapter is enabled after establishing initial contact, as sensed by the change in the current. PSID information is enabled for communication through the conductor after enabling the power.

Figure 1:
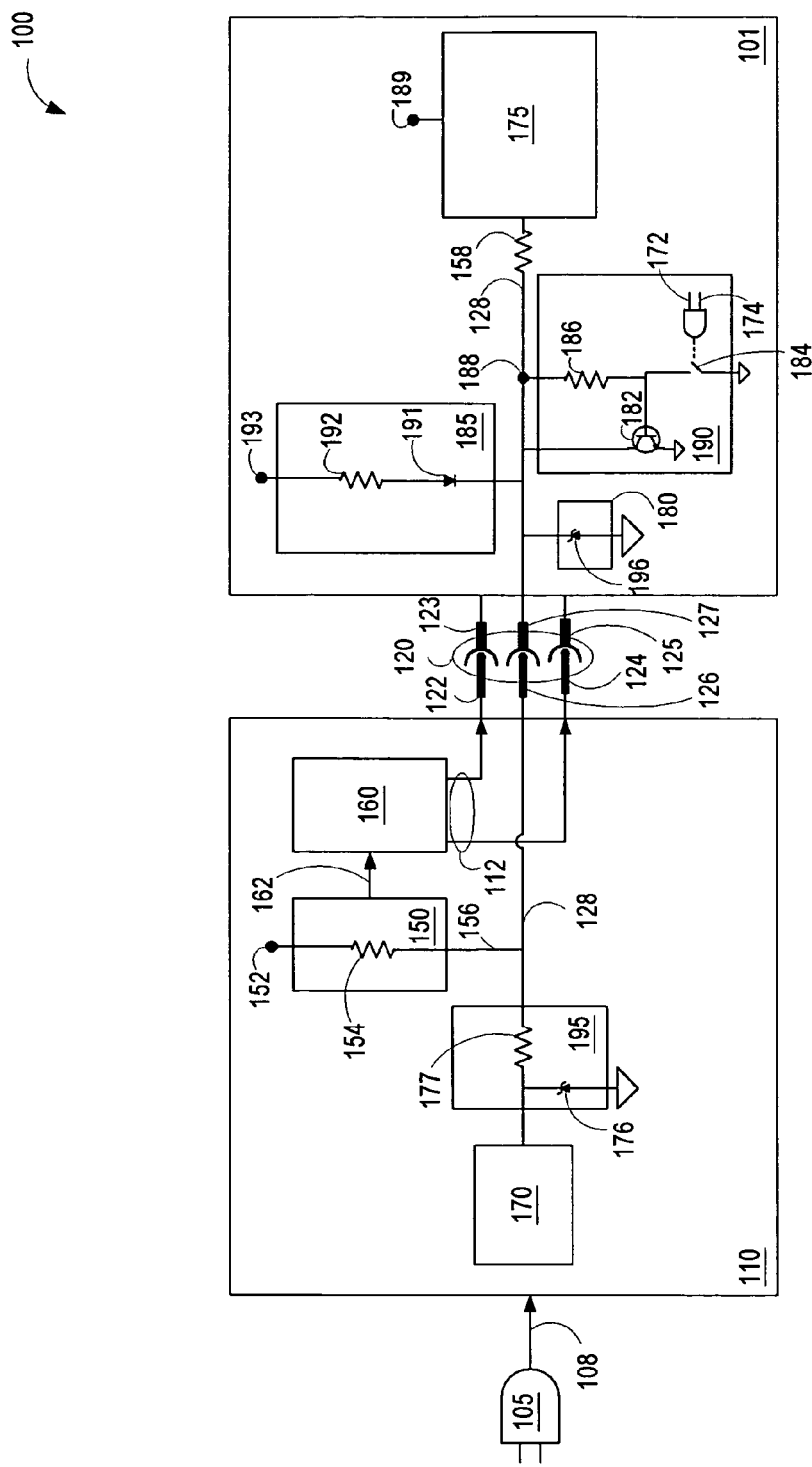
FIG. 1 illustrates a schematic block diagram of an improved power supply system providing power to a portable IHS, according to an embodiment.

FIG. 1 illustrates a schematic block diagram of an improved power supply system 100 providing power to the portable IHS device 101, according to an embodiment. The power supply system 100 includes an AC/DC power adapter 110 operable to provide power to a load such as the portable IHS device 101 via a multi-conductor connector 120.

Many types of multi-conductor connectors are commercially available. A first portion, e.g., male or female, of the connector 120 is electrically coupled to the adapter 110 and a matching second portion, e.g., female or male, of the connector 120 is electrically coupled to the device 101. In one embodiment, the connector 120 is a co-axial, plug-in-type 3-pin connector, which includes a positive terminal matching plug/receptacle pair 122 and 123, a negative terminal matching plug/receptacle pair 124 and 125 and a center pin matching plug/receptacle pair 126 and 127. Additional detail of another type of the connector 120 is described in FIG. 2.

In the depicted embodiment, the power adapter 110 is an AC/DC adapter. The input signal 108 is an AC power input, which is generally received from a 120 V, 60 Hertz or 220 V, 50 Hertz signal source from the wall outlet 105. The output 112 of the adapter 110 is a DC signal, which is transferred to the device 101 via positive and negative terminal pairs 122/123 and 124/125. The output 112 may vary within a predefined DC voltage range. For example, in one embodiment, the output 112 varies approximately between 17.5 volts and 19.6 volts. For certain types of portable IHS devices such as cellular phones, PDA's and electronic games the DC voltage range may be lower.

In one embodiment, data and/or information exchange between the adapter 110 and the device 101 is communicated over a data channel 128, which includes the center pin matching pairs 126/127. In one embodiment, the data channel 128 is used for communicating power supply identifier (PSID) information. Some IHS manufacturers such as Dell Products, LP (Round Rock, Tex., USA) have provided a smart power supply system, which includes the PSID scheme to identify the various types of power supply sources present. Information included in a PSID for each power peripheral may include attributes such as power type (e.g., AC or DC), wattage/voltage/current rating, peripheral manufacturer, part number, country of origin and similar others. Availability of such PSID information, which may be stored in memory, is advantageously used to match components and improve coordination between various power peripherals, thereby improving performance and increasing reliability and safety of the portable IHS device 101.

Alternative techniques for identifying power supply may be utilized. As described earlier, PSID refers to a digital identification or signature encoded in semiconductor chip included in power devices. In one embodiment, the PSID may be a certain current or voltage level present on a data line such as the data channel 128. In one embodiment, PSID information may be superimposed on a signal or power line. Querying for PSID information may be a transient event appearing only during state transitions or may be present as a steady state signal. In one embodiment, PSID information may be obtained synchronously with a timing signal or asynchronously.

In one embodiment, the adapter 110 includes: 1) a contact sense circuit 150 operable to sense a change in a current flowing through a conductor of the connector 120 (such as the data channel 128) in response to the adapter 110 being electrically coupled to the device 101, 2) a control circuit 160 operable to enable the output 112, which provides the power to the device 101 in response to the change in the current, and 3) a power supply identifier (PSID) circuit 170 operable to communicate PSID information through the data channel 128 in response to the power being enabled.

In one embodiment, the contact sense circuit 150 includes an auxiliary voltage source $V_{AUX}$ 152 coupled in series with a limiting resistor $R_L$ 154 connected to the data channel 128. The $V_{AUX}$ 152 is enabled when the adapter 110 is plugged into the wall outlet 105. The adapter 110 is then electrically coupled to the device through the connector 120. Even though the adapter 110 is plugged into the wall outlet 105 and the device 101 is electrically coupled to the adapter 110, the output 112 is not enabled. That is, the adapter 110 does not provide power to the device 101 after the initial contact.

In order to enable the output 112 thereby enabling the flow of power to the device 101, verification of the establishment of the initial contact via connector 120 is made by sensing a change in $I_{PSID}$ 156 current flowing through the data channel 128. Before the initial contact the value of the $I_{PSID}$ 156 current is zero. After electrically coupling the adapter 110 to the device 101 via the connector 120, a finite value of the $I_{PSID}$ 156 current flows through the data channel 128 due to the availability of a path to ground (not shown) in the device 101. Thus, sensing a change in the current $I_{PSID}$ 156 is indicative of the establishment of a proper initial contact. Additional detail of the change in the current $I_{PSID}$ 156 after initial contact is described in FIG. 3.

A control input 162 indicative of the change in the current $I_{PSID}$ 156 is received by the control circuit 160 and in response, the control unit 160 enables the output 112 of the adapter 110. The output 112 provides the DC power to the device 101. The device 101 recognizes the availability of DC power via positive and negative pin pairs 122/123 and 124/125 and prepares the data channel 128 to perform communication function. After enabling the output 112 and preparing the data channel 128 for handling communications, the PSID circuit 170 coupled to the data channel 128 is operable to respond to requests regarding PSID information. A power adapter such as the adapter 110, which is operable to enable the output 112 after establishing initial contact, is described to have a soft start function and/or a remote on/off function.

In one embodiment, an optional, protective, adapter clamp circuit 195 is placed in series between the PSID circuit 170 and the center pin 126 and is operable to clamp the voltage of the data channel 128 within the adapter 110 to a predefined value such as 12 volts. The adapter clamp circuit 195 includes a zener diode 176 having a reverse bias voltage equal to the predefined value and a resistor $R_{S1}$ 177 having a value of approximately 130 ohms.

In one embodiment, the power supply system 100 also includes some components located in the device 101. These components include: 1) a controller 175 operable to control the operation of the data channel 128, 2) a clamp circuit 180 operable to clamp the voltage present on the data channel 128 to a predefined value, 3) a power circuit 185 operable to provide auxiliary power to a legacy power adapter without the soft start and/or remote on/off function, and 4) a channel control circuit 190 operable to enable communication on the data channel 128 after initial contact. Each of the clamp circuit 180, the power circuit 185, the channel control circuit 190, and the controller 175 are electrically coupled to the data channel 128. In one embodiment, the clamp circuit 180, the power circuit 185 and the channel control circuit 190 may be combined into one circuit or into the controller 175.

In one embodiment, the clamp circuit 180 is operable to clamp the voltage of the data channel 128 within the device 101 to a predefined value. The predefined data value is suitable for facilitating low voltage data communication such as 3.3 volts. The clamp circuit 180 includes a zener diode 196 having a reverse bias voltage equal to the predefined value. Upon establishment of initial contact, the zener diode 196 is reversed biased by the current $I_{PSID}$ 156 and the voltage of the data channel 128 is maintained at approximately the predefined value.

In one embodiment, the power circuit 185 may be provided as an option. The power circuit 185 is operable to provide auxiliary power to a legacy power adapter that does not support the soft start and/or remote on/off function. The power circuit 185 includes a diode 191 and a resistor $R_A$ 192 connected in series providing current to the data channel 128 from a voltage source $V_A$ 193 that is always above a predefined voltage such as 3 volts. The power circuit 185 provides power to the PSID circuit 170 included in a legacy adapter (not shown) that does not support the soft start function.

In one embodiment, the channel control circuit 190 includes a transistor $Q_J$ 182 having its collector electrically coupled to the data channel 128, its emitter electrically coupled to the ground and its base electrically coupled to a switch $S_J$ 184. A resistor $R_J$ 186 is coupled between the data channel 128 and the base of the transistor $Q_J$ 182. It is the objective of the channel control circuit 190 to control voltage $V_J$ 188 so that the presence of the voltage $V_J$ 188 does not lock up and/or damage the controller 175. In one embodiment, the avoidance of a lock up condition is implemented by controlling the voltage $V_J$ 188 to be at least 0.3 volts below the supply voltage $V_{CC}$ 189 of the controller 175.

Upon establishment of initial contact, the transistor $Q_J$ 182 provides the return path to ground for the current $I_{PSID}$ 156 and voltage $V_J$ 188 is grounded. The value of the current $I_{PSID}$ 156 changes from an initial value of zero (before contact is established via connector 120) to a maximum value (after contact is established via connector 120). The specific maximum value reached is determined by choice of $V_{AUX}$ 152 and resistor $R_L$ 154. After the adapter 110 enables the output 112, the voltage $V_J$ 188 floats to the predefined value such as 3.3 volts by operation of the switch $S_J$ 184. The operation of the switch $S_J$ 184 is controlled by two inputs PSOK 172 indicative of the output 112 being enabled and PSID_EN 174 indicative of the PSID being enabled by the device 101. The value of voltage $V_J$ 188 floats to the predefined value such as 3.3 volts when the data channel 128 is idle and/or ready for operation. The data channel 128 is idle when it is substantially void of any communication signal. In one embodiment, the switch $S_J$ 184 is implemented using well-known field effect transistor (FET) devices.

In one embodiment, the controller 175 may be a super I/O controller capable of performing a plurality of input/output functions of the device 101 or a keyboard controller capable of controlling the operation of peripheral devices like the keyboard. In order to determine its power source and optimize its performance, the controller 175 included within the portable IHS device 101 sends a request signal to the adapter 110 over the bi-directional data channel 128 to request PSID information. Any other power peripherals if present, such as external battery packs may also be queried over the data channel 128.

The response signal received by the controller 175 from the PSID circuit 170 over the data channel 128 includes the requested PSID attribute information. For example, a response may include information such as 'DC 150' or 'AC 100'. The DC 150 may indicate a DC type power source rated to operate at 150 watts, and the AC 100 may indicate an AC type power source rated to operate at 100 watts. Such requests or queries for PSID information are initiated by the controller 175 and are triggered in response to power events such as plugging or unplugging of AC-DC adapter 110 from the wall socket 105. In one embodiment, a current limiting resistor $R_{NOPSID}$ 158 is included in series between the data channel 128 and the controller 175.

Figure 2:
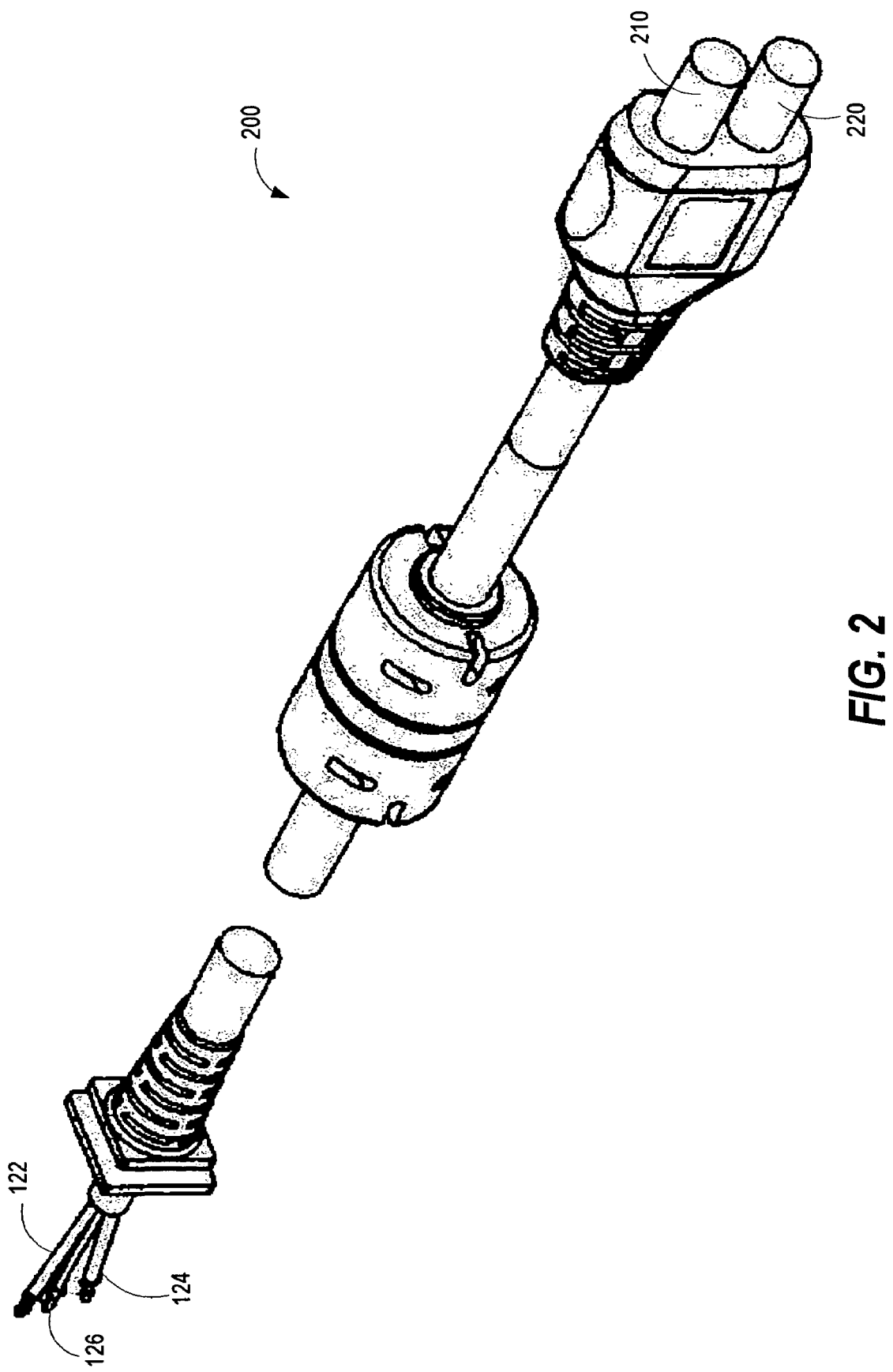
FIG. 2 is an isometric view illustrating a dual-head legacy plug-in type connector of FIG. 1.

FIG. 2 is an isometric view illustrating a dual-head type legacy plug-in connector of FIG. 1. In the depicted drawing, the connector 120 is a dual-head, 3-pin connector 200. The dual-head design enables the adapter 110 to deliver additional current/power to the device 101, since each of the two heads 210 and 220 of the connector 120 shares a portion of the total current. For example, each head may carry 10 amperes of current for a total load current of 20 amperes. Each of the dual-heads 210 and 220 are plug-in-type when mated with a corresponding matching receptacle (not shown) enables the electrical coupling between the adapter 110 and the device 101. Each of the dual-heads 210 and 220 include an identical 3-pin connector arrangement, with the outer positive and negative terminal pairs 122/123 (not shown) and 124/125 (not shown) providing the output 112 and the center pin matching pairs 126/127 (not shown) being included in the data channel 128.

Figure 3:
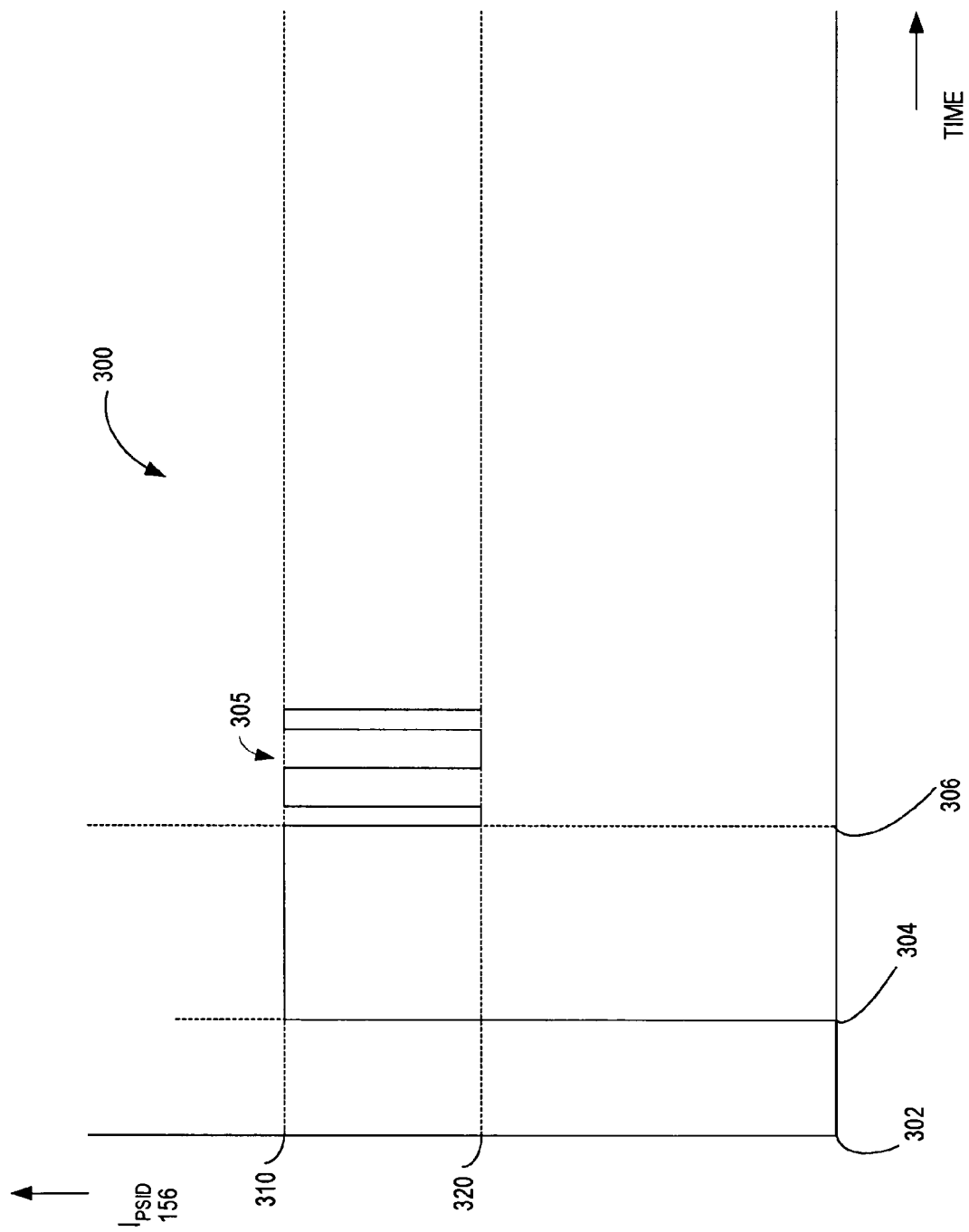
FIG. 3 illustrates a waveform for current flowing through a conductor of the connector of FIG. 1, according to an embodiment.

Referring to FIG. 3, a waveform 300 for current $I_{PSID}$ 156 flowing through the data channel of FIG. 1 is illustrated, according to an embodiment. At time $t_0$ 302, the adapter 110 is plugged into the wall outlet 105 but is not electrically coupled to the device 101. The current $I_{PSID}$ 156 (shown on Y-axis) is zero due to an open circuit. At time $t_1$ 304, the adapter 110 is electrically coupled to the device via the connector 120. As a result, the current $I_{PSID}$ 156 changes from a zero value to a maximum value $I_H$ 310. Upon sensing the change, the adapter 110 enables the output 112 thereby providing DC power to the device 101. As described earlier, the channel control circuit 190 stabilizes the voltage $V_J$ 188 to approximately 3.3 volts at time $t_2$ 306 and the current $I_{PSID\ 156}$ changes from a value $I_H$ 310 to a value $I_L$ 320. The data channel 128 enters an idle state and awaits further communication, which is indicated by changes 305 in value of the $I_{PSID}$ 156 between $I_H$ 310 and $I_L$ 320.

Figure 4:
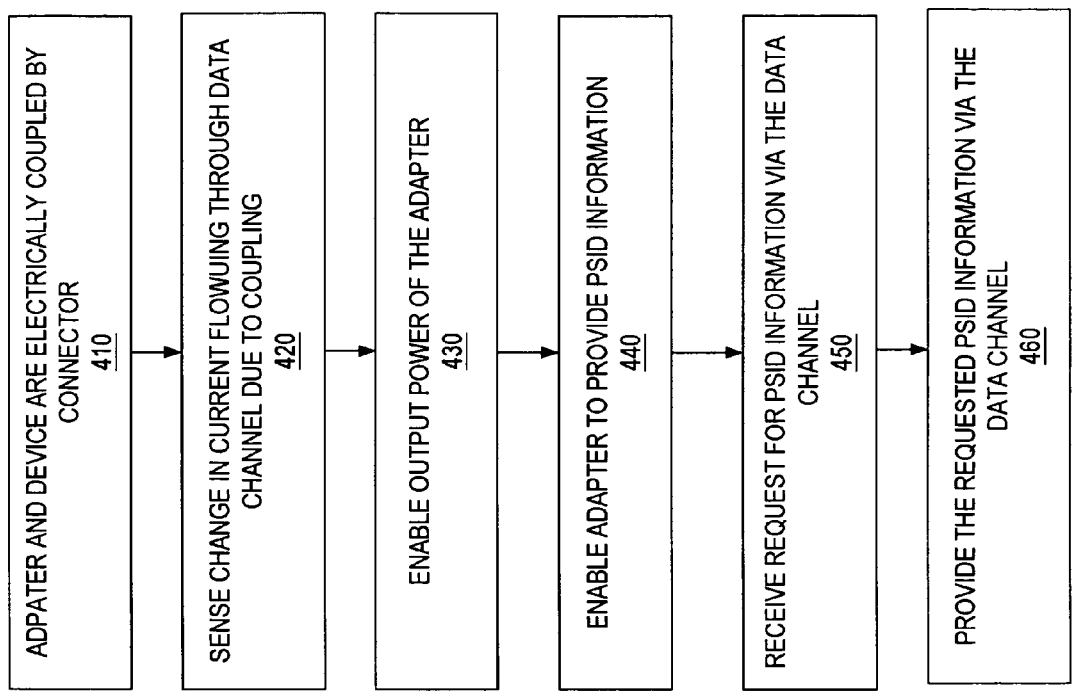
FIG. 4 illustrates a flow chart of a method for operating a power adapter providing power to a load, according to an embodiment.

FIG. 4 is a flow chart illustrating a method for operating a power adapter providing power to a load, according to an embodiment. In step 410, the adapter 110 is electrically coupled to the device 101 by the connector 120. In step 420, a change in the current $I_{PSID}$ 156 flowing through the center pin pairs 126/127 (part of the data channel 128) is sensed in response to the coupling. In step 430, the output 112 is enabled after verification of the initial contact, with the output 112 providing the DC power to the device 101. In step 440, the adapter 110 is enabled to provide PSID information through the data channel 128 after providing power to the device 101. Various steps described above may be added, omitted, combined, altered, or performed in different orders. For example, two additional steps may be added to operate the adapter 110. In step 450, a request for the PSID information is received by the adapter 110 through the data channel 128. In step 460, the adapter 110 provides the requested PSID information through the same data channel 128.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 5:
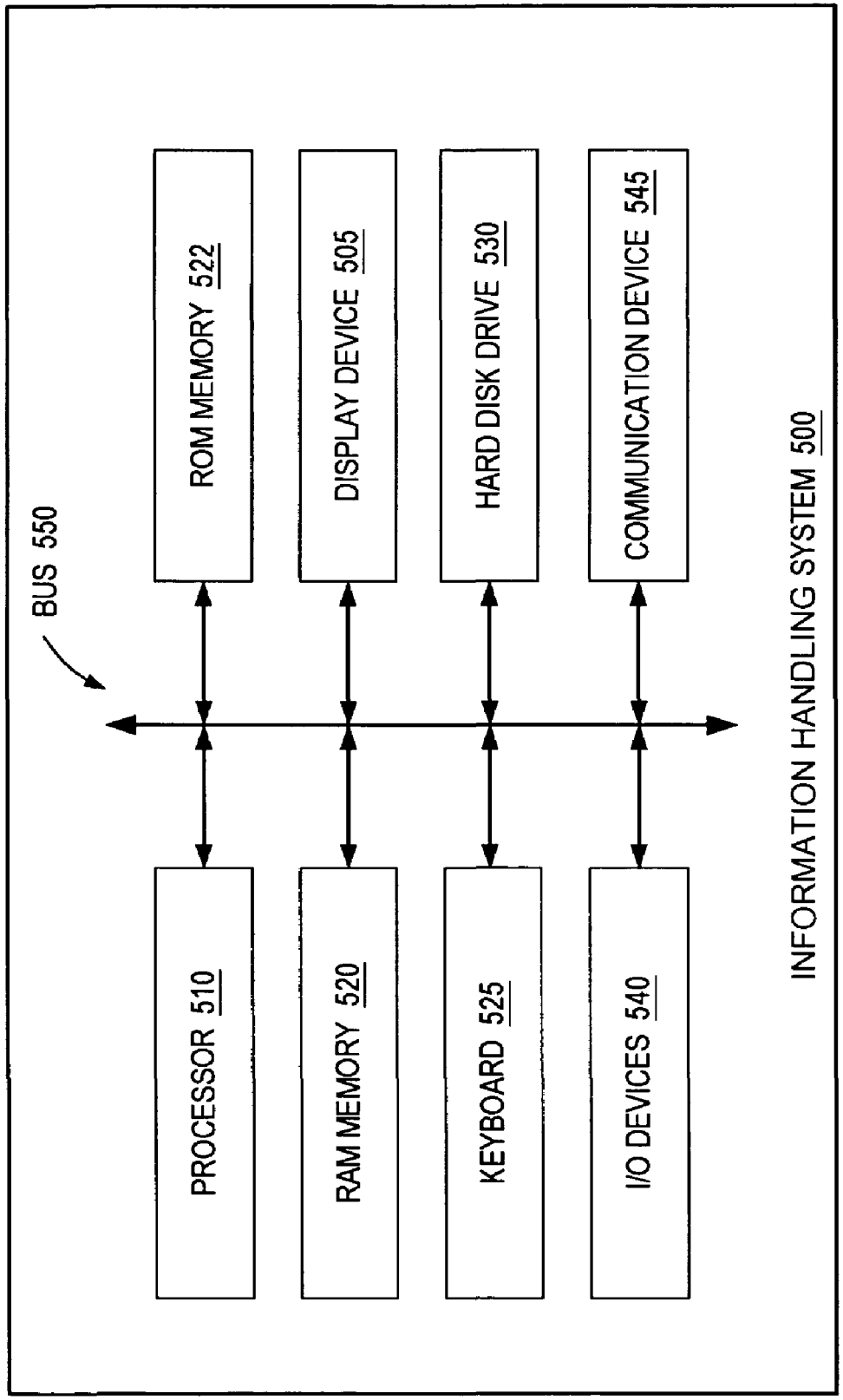
FIG. 5 illustrates a block diagram of an information handling system having an improved power supply system, according to an embodiment.

FIG. 5 illustrates a block diagram of an information handling system 500 having an improved power supply system (not shown), according to an embodiment. The information handling system 500 includes a processor 510, a system random access memory (RAM) 520 (also referred to as main memory), a non-volatile ROM 522 memory, a display device 505, a keyboard 525 and an I/O controller 540 for controlling various other input/output devices. In one embodiment, the I/O controller 540 is substantially the same as the controller 175 of FIG. 1. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. In one embodiment, the IHS 500 may include multiple instances of the bus 550. A communications controller 545, such as a network interface card, may be connected to the bus 550 to enable information exchange between the IHS 500 and other devices (not shown).

In one embodiment, the portable IHS 101 device described in FIG. 1 is implemented as the IHS 500. In this embodiment, the improved power supply system 100 (not shown) described in FIG. 1 provides power to one or more components of the IHS 500.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. Accordingly, it is appropriate that the appended claims be construed broadly and in a manner consistent with the scope of the embodiments disclosed herein.

What is claimed is:

1. A power adapter to provide electrical power to a load through a multi-conductor connector, the power adapter comprising:
    a multi-conductor connector comprising first, second, and third conductors;
    a contact sense circuit to sense a change in a current flowing through the first conductor in response to a power adapter being electrically coupled to the load, wherein the first conductor is coupled to the contact sense circuit;
    a control circuit to enable electrical power in response to the change, in the first conductor, the electrical power being enabled via the second and third conductors; and
    a power supply identifier (PSID) circuit to communicate PSID information through the first conductor after the electrical power is enabled.

2. The power adapter of claim 1, wherein the electrical power is disabled when the current is equal to zero.

3. The power adapter of claim 1, wherein the current flowing through the first conductor changes from a first value to a second value, wherein the first and second values are respectively sensed prior to and after the power adapter is coupled to the load.

4. The power adapter of claim 1, wherein the multi-conductor connector includes a matched pair of a pluggable 3-pin connector, wherein a portion of the 3-pin connector electrically coupled to the power adapter is removably inserted into a corresponding matching receptacle of the 3-pin connector electrically coupled to the load.

5. The power adapter of claim 4, wherein the first conductor comprises a center pin of the 3-pin connector, and wherein the second and third conductors comprise two outer pins of the 3-pin connector.

6. The power adapter of claim 1, wherein the load includes a controller to communicate with the PSID circuit through the first conductor.

7. The power adapter of claim 1, wherein a voltage of the first conductor is controlled to be less than a supply voltage of the controller by a predefined difference.

8. The power adapter of claim 1, wherein a voltage of the first conductor is stabilized to a predefined level while operating in an idle mode, wherein the idle mode is indicative of the first conductor being void of communications activity.

9. The power adapter of claim 8, wherein the predefined level is approximately equal to 3.3 volts.

10. The power adapter of claim 1, wherein the multi-conductor connector is rated for repeated insertions.

11. The power adapter of claim 1, wherein the multi-conductor connector includes a dual-head pluggable 3-pin connector, wherein each head shares at least a portion of the current.

12. A method for operating a power adapter providing electrical power to a load, the method comprising:
    electrically coupling a power adapter to a load by a multi-conductor connector, wherein the multi-conductor connector comprises first, second, and third conductors;
    sensing a change in a current flowing through the first conductor in response to the coupling;
    providing a control circuit to enable electrical power in response to the change in the first conductor, the electrical power being enabled via the second and third conductors; and
    enabling the power adapter to communicate power supply identifier (PSID) information through the first conductor.

13. The method of claim 12, further comprising:
    receiving from the load a request for the PSID information, the request being received through the first conductor; and
    providing the PSID information to the load through the first conductor.

14. The method of claim 12, wherein the electrical power is disabled when the current is equal to zero.

15. The method of claim 12, wherein the change is from a first value to a second value of the current, wherein the first and second values are respectively sensed prior to and after the power adapter is coupled to the load via the second and third conductors.

16. The method of claim 12, wherein the multi-conductor connector includes a matched pair of a pluggable 3-pin connector, wherein a portion of the 3-pin connector electrically coupled to the power adapter is removably inserted into a corresponding matching receptacle of the 3-pin connector electrically coupled to the load.

17. The method of claim 16, wherein the first conductor comprises a center pin of the 3-pin connector, and wherein the second and third conductors comprise two outer pins of the 3-pin connector.

18. An information handling system (IHS) comprising:
    a processor;
    a multi-conductor connector comprising first, second, and third conductors; and
    a contact sense circuit to sense a change in a current flowing through the first conductor in response to a power adopter being electrically coupled to the load, wherein the first conductor is coupled to the contact sense circuit;
    a control circuit to enable electrical power in response to the change in the first conductor, the electrical power being enabled via second and third conductors; and
    a power supply identifier (PSID) circuit to communicate PSID information through the first conductor after the electrical is enabled.

19. The system of claim 18, further comprising:
    a controller coupled to the processor, wherein the controller receives the electrical power and the PSID information.

20. The system of claim 18, wherein the processor controls a switch to maintain a voltage of the first conductor to be within a predefined range of a supply voltage of the controller.

* * * * *

UNITED STATES PATENT AND TRADEMARK OFFICE
CERTIFICATE OF CORRECTION

| | |
|---|---|
| PATENT NO. | : 7,392,410 B2 |
| APPLICATION NO. | : 10/966779 |
| DATED | : June 24, 2008 |
| INVENTOR(S) | : Robert Allen et al. |

Page 1 of 1

It is certified that error appears in the above-identified patent and that said Letters Patent is hereby corrected as shown below:

Claim 18, Column 10, Line 19, after the word conductors delete "and".

Signed and Sealed this

Third Day of March, 2009

JOHN DOLL
*Acting Director of the United States Patent and Trademark Office*